June 19, 1962 M. D. KULIK 3,040,060
RECOVERY OF PHTHALIC ANHYDRIDE FROM STILL RESIDUES
Filed May 23, 1960
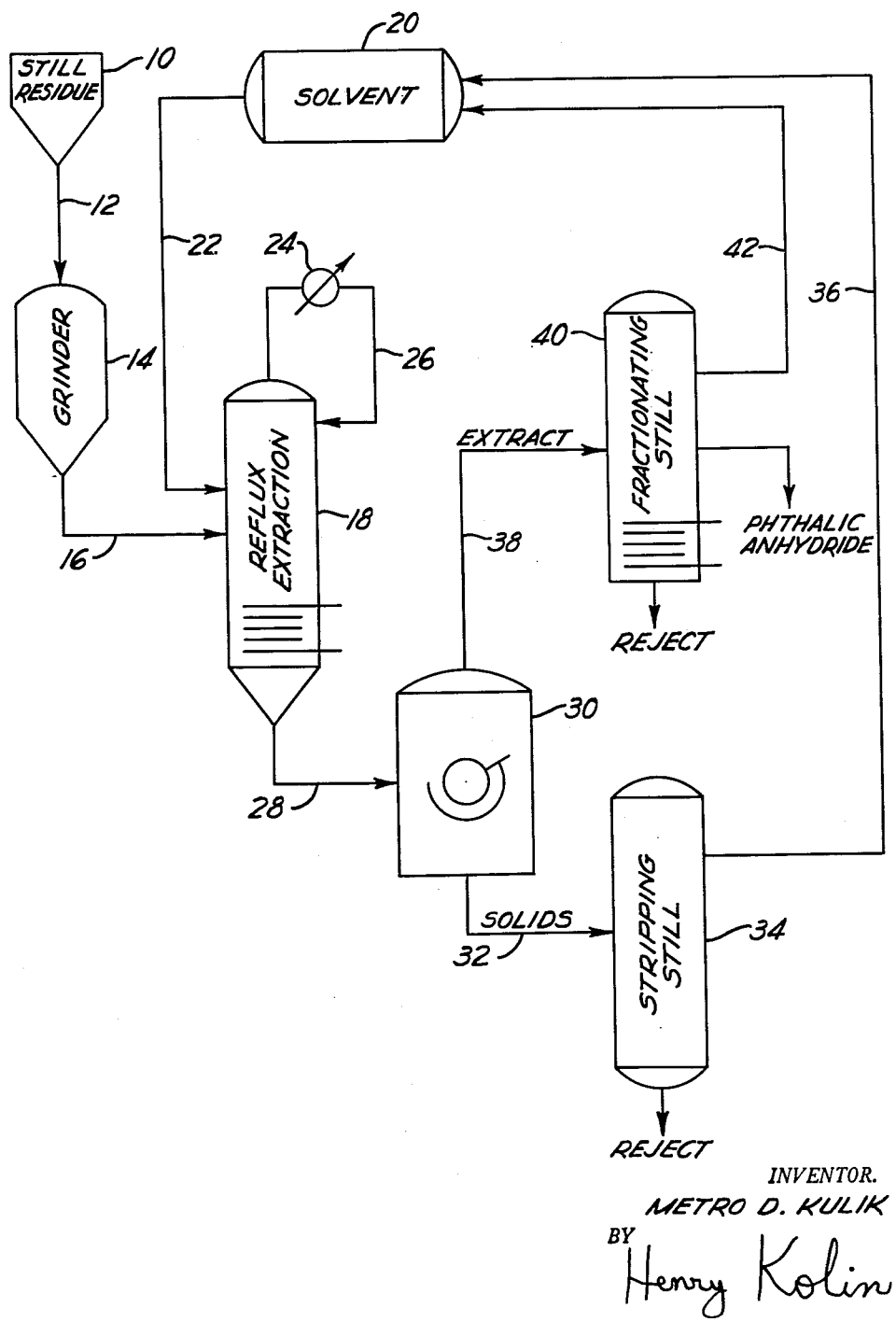
INVENTOR.
METRO D. KULIK
BY
Henry Kolin 3,040,060
Patented June 19, 1962

1

3,040,060
RECOVERY OF PHTHALIC ANHYDRIDE FROM STILL RESIDUES
Metro D. Kulik, Pittsburgh, Pa., assignor to Consolidation Coal Company, Pittsburgh, Pa., a corporation of Pennsylvania
Filed May 23, 1960, Ser. No. 31,013
6 Claims. (Cl. 260—346.7)

This invention relates to the production of phthalic anhydride. More particularly, it relates to the recovery of phthalic anhydride from still residues produced in the purification of crude phthalic anhydride.

Phthalic anhydride is a valuable article of commerce used in the production of alkyd resins, plasticizers, and dyes. It is produced principally by air oxidation of naphthalene or ortho-xylene vapors in the presence of a vanadium oxide catalyst, followed by condensation of the crude product that is formed. The obtained crude phthalic anhydride contains various impurities such as maleic anhydride, naphthoquinones, and tarry substances. The presence of these impurities is highly undesirable since for most applications for which phthalic anhydride is now used a highly purified product is required. Following withdrawal of the crude product from the primary recovery units, it is melted and then customarily purified by vacuum fractional distillation in a packed column. In general, two distillations of the crude product are required. In addition, chemical purification procedures may be employed.

As a result of the distillation, there remains in the still a tarry distillation residue which may amount to between 3 and 10 percent of the original crude product treated, and which contains in addition to various impurities considerable quantities of phthalic anhydride. The proportion of phthalic anhydride remaining in the still residue is usually dependent upon the desired purity level of the phthalic anhydride product. If a product of low grade is being produced, distillation may be carried to a point at which the phthalic anhydride content of the residue is relatively small, less than 20 percent by weight. On the other hand, where a highly refined product is being prepared, distillation residues may contain as much as 95 percent by weight of phthalic anhydride. The phthalic anhydride content of the residue is ordinarily of the order of 30 to 60 percent by weight.

The recovery of the phthalic anhydride present in the tarry distillation residues can thus be of considerable economic importance. Consequently, various proposals have been made for recovering this phthalic anhydride. In one such proposal, phthalic anhydride is recovered from the still residue by further distillation. However, the residue of such a further distillation is a pitch or coke which is very similar in character to coal-tar distillation residues and equally difficult to remove from the still. Also, with the relatively high temperatures required for such a distillation, decomposition of some of the tarry impurities and of some of the phthalic anhydride occurs, and may lead to decarboxylation of phthalic anhydride to form benzoic acid. This benzoic acid passes over with the phthalic anhydride distillate and is difficultly separable therefrom.

It has also been proposed to solidify and grind the molten phthalic anhydride residue, and then leach the ground residues with water to convert the phthalic anhydride that is present to an aqueous phthalic acid solution. It has been found that the leaching process proceeds extremely slowly. If an attempt is made to accelerate the leaching process by resort to alkaline extraction, then a subsequent neutralization is required, so that both alkali and acid are expended in the process.

2

It has also been proposed to mix the still residue in the molten state with a hydrocarbonaceous material that is substantially nonvolatile at the boiling point of phthalic anhydride, and then distill off the phthalic anhydride from the mixture. Such a process may still not eliminate contamination of the phthalic anhydride in addition to forming coke-like substances.

It has further been proposed to avoid the problem of recovery of phthalic anhydride, as such, by running molten phthalic anhydride still residue into water to hydrolyze phthalic anhydride to phthalic acid, which dissolves in the water. However, recovery of the phthalic acid in purified form from the water then becomes a problem.

In yet another proposed process, the still residue is treated with a lower aliphatic alcohol to convert the phthalic anhydride to a monoester of phthalic acid. The ester is then decomposed to regenerate phthalic anhydride. This process is relatively complex, and great care must be taken to avoid formation of the diester.

All of the foregoing processes, while feasible to some extent, are open to various technical and economic objections which militate against their wide-spread commercial adoption. Consequently, many phthalic anhydride producers still treat the tarry distillation residue as a disposable waste product whose recovery is lacking in economic incentive.

Accordingly, it is an object of the present invention to provide a method for the recovery of phthalic anhydride from still residues free from the objections heretofore present.

It is a further object to provide a commercially useful method for the recovery of phthalic anhydride in high purity and in high yields from still residues.

In accordance with the broad aspects of this invention, particulate solidified phthalic anhydride still residue is extracted with a selective nonpolar, nonreactive oxygenated organic solvent. The phthalic anhydride is soluble in this solvent and is chemically nonreactive therewith. The treatment of the particulate still residue by the solvent is carried out in a solid-liquid extraction system at a temperature below about 150° C. for a sufficient period of time to selectively extract the phthalic anhydride from the still residue. The recovered extract is then distilled to first remove the solvent. The extract residue contains the extracted phthalic anhydride free from most of the impurities originally present. This extract residue is then distilled to obtain highly purified phthalic anhydride.

The selective nonpolar, nonreactive oxygenated organic solvents that may be advantageously used in the practice of this invention dissolve phthalic anhydride in high yield and do so selectively; i.e., they dissolve but a minimum of the remaining tarry residue. Further, they do not form chemical reaction products with phthalic anhydride as do the alcohols. These latter compounds must be avoided because they form esterification products with the phthalic anhydride thereby reducing its yield and further requiring additional elaborate recovery steps.

Although from a theoretical point of view it is difficult to draw a sharp line of demarcation between "polar" and "nonpolar" substances, by the term "nonpolar" as used herein to characterize the solvent of this invention, it is specifically intended to exclude the organic acids, alcohols, and aldehydes as suitable solvents. By the term "oxygenated," only an oxygen atom that is directly attached to a carbon atom is intended. Non-oxygenated organic solvents such as the paraffin hydrocarbons, e.g., pentane, hexane, and heptane, and the aromatic hydrocarbons, e.g., benzene and toluene, are unsuitable for use in this process because of their relatively poor solvent power with respect to the phthalic anhydride when contained in the tarry pitch residues. Where lack of solvency is not determinative, the combination with other undesirable features excludes such solvents. A preferred group of solvents for use in this invention are the ketones, ethers, and esters, with particular reference to the industrial solvents in this group (see I. Mellan, "Industrial Solvents," 2d ed., Reinhold Publ. Corp., New York, 1950). Mixed ketones, ethers, and esters that also contain polar groups, e.g., carboxyl, hydroxyl, and aldehyde, are not considered as falling within the scope of those compounds contemplated for use in the practice of this invention. For example, acyloins would not be considered as ketones for use in the practice of this invention.

It is also obvious that many specific oxygenated organic solvents will be technically feasible for carrying out the process of this invention. However, inasmuch as economic considerations are determinative with regard to the commercial utilization of this process, the use of esoteric and expensive solvents will obviously be avoided. A commercially suitable solvent, i.e., an industrial solvent, within the framework of this invention will ordinarily be of high solvent power, inexpensive, readily available, and readily recoverable. Furthermore, in order to insure maximum ease of separation of the solvent, it must have a substantially lower boiling point than phthalic anhydride, which boils at 284.5° C. For obtaining optimal extraction at minimal residence times, it is preferred to operate the solid-liquid extraction system at the atmospheric reflux temperature of the solvent. Therefore a solvent having a boiling temperature not above about 150° C. will be preferred in order to keep the tarry still residue at a temperature at which it is solid. Liquid-liquid extraction has been found unsuitable for the practice of this invention because at the elevated temperatures required to obtain free flow of the tarry reject phase, polymerization and decomposition of the tarry still residue occur. Depending on the specific solvent used, an extraction time of 15 minutes to 3 hours is suitable.

While the ketones, ethers, and esters constitute a preferred group of solvents within the framework of this invention, I find that the lower alkyl ketones are particularly suitable from a technical and commercial point of view. By a lower alkyl ketone, I refer to a ketone of type formula RCOR′, where R and R′ are selected from alkyl groups having from one to five carbon atoms. Among this group of lower alkyl ketones, I find methyl ethyl ketone to be outstanding technically. Its use for the recovery of phthalic anhydride from certain still residues may make for commercial operability not otherwise obtainable.

For a more detailed description of this invention with respect to its objects, features, and advantages, reference should be had to the sole FIGURE of the drawing in which is shown a schematic outline of a preferred embodiment of the process of the present invention.

Referring to the drawing, phthalic anhydride still residue is contained in a hopper vessel 10. This still residue may contain from 20 to 95 percent by weight of phthalic anhydride. It generally represents upwards of 3 percent of the over-all yield of phthalic anhydride. In commercial practice, the still residue will ordinarily be the residue obtained from the second stage of a two-stage distillation operation. In practicing this invention, it is preferred to drain the residue from the still while it is still in molten form. It is then allowed to solidify.

The solidified tarry pitch-like residue is passed through a conduit 12 to a pulverizer or grinder 14 where it is comminuted to a particle size passing through a ½-inch standard sieve (ASTM Designation E 11–39). Any appropriate hammer mill, disk grinder, or pulverizer may be used. In general, the finer the particle size the more rapid and complete will be the extraction. However, too fine a particle size will result in the filtration of the tarry pitch residue being made more difficult because of blinding of the filter cloth. It has been found that if the pitch residue is ground to a particle size passing a standard ¼-inch sieve, i.e., 0 x ¼ inch particles are present, extraction will be highly effective and filtration will proceed at a rapid rate. While a distribution containing coarser particles obtained by pulverizing the particles to pass through a ½-inch sieve may be used, the use of these particles will require a longer residence time to achieve the same degree of extraction.

The solid particles of still residue are passed through a conduit 16 to an extraction vessel 18 where they are contacted under extraction conditions with a suitable oxygenated organic solvent which selectively extracts the phthalic anhydride, but is non-reactive therewith. This solvent, contained in a storage vessel 20, is fed through a conduit 22 to vessel 18.

Among solvents which may be used are the ketones such as acetone, methyl acetone, methyl ethyl ketone, methyl n-propyl ketone, diethyl ketone, mesityl oxide, cyclohexanone, methyl isobutyl ketone, methyl n-butyl ketone, ethyl n-butyl ketone, methyl n-amyl ketone, acetophenone, methyl n-hexyl ketone, isophorone, diisobutyl ketone, propylphenone, benzophenone, fluoroacetophenone, p-dimethylamino benzophenone, etc. Ethers that may be used include methyl ether, ethyl ether, isopropyl ether, methyl ethyl ether, methyl propyl ether, ethyl propyl ether, n-butyl ether, amyl ether, n-hexyl ether, methyl butyl ether, ethyl butyl ether, propyl butyl ether, 1,4-dioxane, tetrahydrofuran, tetrahydropyran, 1,2-propylene oxide, etc. Esters that may be used include methyl acetate, n-propyl acetate, isopropyl acetate, n-butyl acetate, isobutyl acetate, amyl acetate, methyl propionate, methyl butyrate, methyl valerate, methyl caproate, methyl heptonate, methyl caprylate, methyl pelargonate, methyl caprate, ethyl acetate, ethyl propionate, ethyl butyrate, ethyl pelargonate, ethyl caprate, propyl propionate, propyl butyrate, propyl valerate, propyl caproate, propyl heptonate, propyl caprylate, propyl pelargonate, propyl caprate, etc.

It is also to be understood that these above-enumerated solvents are only representative of the class of compounds which may be used in this invention, and that the invention is not necessarily limited to those specifically enumerated. On the other hand, it will be immediately realized that while nonpolar oxygenated organic solvents that are nonreactive with phthalic anhydride are considered feasible for the practice of this invention, obviously not all of these solvents will behave with equivalent solvent efficiency nor be equally desirable as industrial solvents. Clearly, additional considerations such as commercial availability, cost, ease of handling, boiling range, ease of recovery, toxicity, corrosive effect on equipment, and the like will determine the specific selection of a solvent to be used for a specific commercial application.

The solid-liquid extraction must be performed at a temperature below about 150° C. A temperature range between about 60 and 150° C. is preferred. It is ordinarily commercially preferred for convenience and extraction efficiency to operate a solid-liquid extraction system at the atmospheric reflux temperature of the solvent. Thus vessel 18 is equipped with a reflux condenser 24 for return of condensed solvent through a conduit 26 to vessel 18.

Thus for operation under atmospheric reflux conditions the class of preferred solvents of ketones, ethers, and esters will be further limited to those of these solvents having a boiling temperature below about 150° C. Among these further preferred solvents, those lower alkyl ketones boiling below about 150° C. will be particularly preferred because of their efficiency and ready availability. Among these ketones, methyl ethyl ketone, which boils at 80° C., has been found to be outstanding. Among the esters, the lower-alkyl-substituted organic acetates are generally preferred because of their solvent power, ready availability, low boiling point, and ease of handling.

Depending upon the amount of phthalic anhydride present in the still residue, the specific solvent used, and other extraction conditions, weight ratios of solvent to still residue varying from 0.5:1 to 5:1 may be employed. For most conditions of extraction, a 1:1 ratio is preferred. Depending upon the particle size of the particulate still residue, the amount of phthalic anhydride present, the proportion of solvent to residue employed, the extraction temperature used, as well as the specific solvent selected, the residence time in the mixing vessel will vary from about 15 minutes to 3 hours. For most conditions, a residence time of one hour is satisfactory and preferred.

The extract and residue from vessel 18 are passed through a conduit 28 to a filter 30. While the use of pressure filtration is ordinarily preferred, the choice of a specific filter will be determined in part by the solvent to solid ratio and the particle size of the solid. In place of a filter, a centrifuge may also be used. The carbonaceous solids are removed from the filter through a conduit 32 and sent to a stripping still 34, from whence the stripped solvent is returned by way of a conduit 36 to solvent storage vessel 20. The filtrate from filter 30 is passed through a conduit 38 to a fractionation still 40. The solvent is recovered as a first overhead distillate and returned by way of a conduit 42 to storage vessel 20. The product that remains may be recovered from still 40 and combined with similar residues for a separate distillation treatment. Or the distillation may be continued in still 40, preferably under vacuum, and the phthalic anhydride recovered as an overhead distillate. The phthalic anhydride pitch that remains as a reject residue may be circulated in the system for further processing.

The following table illustrates the relative solvent strength of both satisfactory and unsatisfactory solvents. The solubility of phthalic anhydride, per se, in the solvent, and also the effectiveness of the solvent in extracting phthalic anhydride from still residue were determined.

*Solubility of Phthalic Anhydride*

| Group A | | Group B | |
| --- | --- | --- | --- |
| Solvent | Solubility | Solvent | Solubility |
| Acetone | Good | Methyl alcohol | Poor. |
| Methyl ethyl ketone | Very good | Ethyl alcohol | Do. |
| Methyl isobutyl ketone | do | Amyl alcohol | Do. |
| Dioxane [1] | do | Diethyleneglycol [1] monomethyl ether (Carbitol) | Fair. |
| Ethyl acetate | Good | | |
| Butyl acetate | do | Formic acid [1] | Poor. |
| | | Acetic acid [1] | Do. |
| | | Benzene | Fair. |
| | | Toluene | Do. |
| | | Hexane | Very poor. |
| | | Heptane | Do. |

[1] No still residue extraction was made.

The industrial solvents listed in group A are exemplary of those that may be used in the practice of this invention. It should be noted that the compound diethyleneglycol monomethyl ether is classifiable as an alcohol because of a reactive hydroxyl group that is present. Thus this compound would not be used in the process of this invention.

The following example represents a specific non-limiting illustration of a preferred embodiment of the invention.

A sample of phthalic anhydride pitch residue which contained about 35 percent by weight of phthalic anhydride was crushed to pass a standard 0.25-inch screen (ASTM E 11–39) and extracted twice using equal amounts by weight of methyl ethyl ketone. The extraction was performed under reflux conditions at a temperature of 80° C. for a combined extraction time of approximately one hour. The mixture was readily filtered, and non-extracted carbonaceous solids were separated as filter cake. After stripping off solvent, the solids content of the filter cake amounted to 60.0 percent by weight of the initial pitch residue. The filtrate extract was distilled to remove the solvent as an overhead distillate, and the phthalic anhydride was distilled off at a vapor line temperature of 147° C. and at a pressure of less than 10 millimeters of mercury. The phthalic anhydride was recovered in a purity of more than 99 percent, as determined by melting point, and in a yield which amounted to 31.0 percent by weight of the initial pitch residue. This corresponds to a recovery of almost 90 percent based on the phthalic anhydride present in the pitch residue. The phthalic anhydride pitch from the extract distillation amounted to 9.0 percent by weight of the initial pitch residue. A more complete recovery of phthalic anhydride is obtainable by grinding the residue to a finer particle size, increasing the time of contact, washing the filter cake, or recycling distillation still bottoms from the final distillation.

According to the provisions of the patent statutes, I have explained the principle, preferred construction, and mode of operation of my invention and have illustrated and described what I now consider to represent its best embodiment. However, I desire to have it understood that within the scope of the appended claims, the invention may be practiced otherwise than as specifically illustrated and described.

I claim:

1. In the recovery of phthalic anhydride from still residues produced in distilling crude phthalic anhydride, the improvement which comprises contacting solid particulate still residue with a nonreactive solvent for phthalic anhydride selected from the class consisting of lower alkyl ketones and lower alkyl acetates, maintaining solid-liquid extraction conditions at a temperature below about 150° C. whereby phthalic anhydride is selectively extracted from said residue by said solvent, and recovering phthalic anhydride from the so obtained extract.

2. In the recovery of phthalic anhydride from still residues produced in distilling crude phthalic anhydride, the improvement which comprises comminuting solidified still residue to particles of a size to pass through a standard ½-inch sieve, heating said particles in a solid-liquid extraction system with a solvent selected from the class consisting of lower alkyl ketones and lower alkyl acetates, maintained at a reflux temperature below about 150° C., phthalic anhydride being soluble in said solvent and nonreactive therewith, recovering an extract containing phthalic anhydride from said system, distilling the extract to first remove the solvent therefrom, and distilling the extract residue to recover phthalic anhydride as a distillate therefrom.

3. The process according to claim 2 wherein said selective solvent consists of methyl ethyl ketone.

4. In the recovery of phthalic anhydride from still residues produced in distilling crude phthalic anhydride, the still residue containing from 20 to 95 percent by weight of phthalic anhydride, the improvement which comprises refluxing methyl ethyl ketone for 15 minutes to 3 hours with solidified still residue having a particle size to pass through a standard ½-inch sieve to selectively extract phthalic anhydride from said residue, filtering the mixture of residue and methyl ethyl ketone to recover the extract as a filtrate therefrom, distilling the extract to remove the methyl ethyl ketone therefrom, and distilling the extract residue under reduced pressure to recover the phthalic anhydride as a distillate therefrom in a yield of at least 80 percent by weight of the phthalic anhydride initially present in said still residue.

5. The process according to claim 4 wherein from 0.5 to 5 parts by weight of methyl ethyl ketone are used per part of still residue.

6. The process of claim 1 in which said solvent is methyl ethyl ketone.

References Cited in the file of this patent

UNITED STATES PATENTS 1,851,383   Daniels _____ Mar. 29, 1932

OTHER REFERENCES

Bergmann: Chemistry of Acetylene and Related Compounds, Interscience Inc., 1948, page 80.

Noller: Chemistry of Organic Compounds, second edition, 1957, pages 197–8.